United States Patent
Bass et al.

(10) Patent No.: US 9,710,310 B2
(45) Date of Patent: Jul. 18, 2017

(54) DYNAMICALLY CONFIGURABLE HARDWARE QUEUES FOR DISPATCHING JOBS TO A PLURALITY OF HARDWARE ACCELERATION ENGINES

(71) Applicant: International Business Machines Corporation, Armonk, NY (US)

(72) Inventors: Brian M. Bass, Apex, NC (US); Bartholomew Blaner, Underhill Center, VT (US); George W. Daly, Jr., Austin, TX (US); Jeffrey H. Derby, Chapel Hill, NC (US); Ross B. Leavens, Cary, NC (US); Joseph G. McDonald, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 14/827,344

(22) Filed: Aug. 17, 2015

(65) Prior Publication Data
US 2015/0355948 A1 Dec. 10, 2015

Related U.S. Application Data

(62) Division of application No. 13/323,914, filed on Dec. 13, 2011, now Pat. No. 9,448,846.

(51) Int. Cl.
*G06F 9/46* (2006.01)
*G06F 9/50* (2006.01)
*G06F 9/48* (2006.01)

(52) U.S. Cl.
CPC .......... *G06F 9/5038* (2013.01); *G06F 9/4843* (2013.01); *G06F 9/5027* (2013.01); *G06F 2209/5021* (2013.01)

(58) Field of Classification Search
None
See application file for complete search history.

(56) References Cited

U.S. PATENT DOCUMENTS 5,687,348 A 11/1997 Whittaker
6,263,302 B1 7/2001 Hellestrand et al.
(Continued)

FOREIGN PATENT DOCUMENTS

EP 1912124 A2 4/2008
WO WO0155847 A1 8/2001

OTHER PUBLICATIONS

Lee, et al. "Architectural Enhacements for Network Congestion Control Applications", IEEE Transactions on Very Large Scale Integration Systems, vol. 14, No. 6, Jun. 2006, pp. 609-615.

*Primary Examiner* — Kenneth Tang
(74) *Attorney, Agent, or Firm* — Reza Sarbakhsh

(57) ABSTRACT

A computer system having a plurality of processing resources, including a sub-system for scheduling and dispatching processing jobs to a plurality of hardware accelerators, the subsystem further comprising a job requestor, for requesting jobs having bounded and varying latencies to be executed on the hardware accelerators; a queue controller to manage processing job requests directed to a plurality of hardware accelerators; and multiple hardware queues for dispatching jobs to the plurality of hardware acceleration engines, each queue having a dedicated head of queue entry, dynamically sharing a pool of queue entries, having configurable queue depth limits, and means for removing one or more jobs across all queues.

3 Claims, 7 Drawing Sheets

(56) References Cited

U.S. PATENT DOCUMENTS

| | | | |
|---|---|---|---|
| 6,363,472 | B1 | 3/2002 | Linnermark |
| 6,584,436 | B2 | 6/2003 | Hellestrand et al. |
| 6,714,960 | B1 | 3/2004 | Bitar et al. |
| 6,751,583 | B1 | 6/2004 | Clarke et al. |
| 6,775,749 | B1 | 8/2004 | Mudgett et al. |
| 7,047,176 | B2 | 5/2006 | Klevans et al. |
| 7,113,516 | B1 | 9/2006 | Shefi et al. |
| 7,460,473 | B1 | 12/2008 | Kodama et al. |
| 7,934,028 | B1 | 4/2011 | Leonard et al. |
| 8,065,680 | B2 * | 11/2011 | Parvathaneni ........ G06F 9/5033 709/201 |
| 8,533,716 | B2 | 9/2013 | Lippett |
| 2002/0143915 | A1 | 10/2002 | Mathieson |
| 2005/0278502 | A1 | 12/2005 | Hundley |
| 2008/0052714 | A1 | 2/2008 | Wong |
| 2008/0118065 | A1 | 5/2008 | Blaisdell et al. |
| 2008/0222383 | A1 | 9/2008 | Spracklen et al. |
| 2008/0222434 | A1 * | 9/2008 | Shimizu ................ G06F 1/3203 713/300 |
| 2008/0235695 | A1 | 9/2008 | Itou |
| 2008/0300707 | A1 | 12/2008 | Ruml et al. |
| 2009/0158282 | A1 | 6/2009 | Blaisdell et al. |
| 2010/0153962 | A1 | 6/2010 | Tatu |
| 2010/0205619 | A1 | 8/2010 | Barsness et al. |
| 2011/0161972 | A1 | 6/2011 | Dillenberger et al. |
| 2013/0152099 | A1 | 6/2013 | Bass et al. |
| 2015/0355949 | A1 | 12/2015 | Bass et al. |

\* cited by examiner

DYNAMICALLY CONFIGURABLE HARDWARE QUEUES FOR DISPATCHING JOBS TO A PLURALITY OF HARDWARE ACCELERATION ENGINES

FIELD OF THE INVENTION

The present invention relates to computer systems employing multiple co-processors as hardware accelerators to improve processing throughput of specific functions and more particularly to a method and apparatus for dynamically configuring hardware queues for dispatching processing jobs to a plurality of independent hardware acceleration engines.

BACKGROUND

General purpose microprocessors are designed to support a wide range of workloads and applications, usually by performing tasks in software. If processing power beyond existing capabilities is required then hardware accelerators may be integrated in a computer system to meet requirements of a particular application.

Hardware accelerators may perform certain tasks more efficiently then processors running a software routine. One aspect of hardware acceleration is that algorithmic operations are performed on data using specially designed hardware rather than generic hardware, as is the case with software running on a microprocessor. A hardware accelerator can be any hardware that is designed to perform specific algorithmic operations on data. In this regard, hardware accelerators generally perform a specific task to offload CPU (Software) cycles. This is accomplished by transferring the data that requires processing into the domain of the hardware accelerator (usually part or all of a chip or a circuit board assembly), performing the hardware accelerated processing on that data, and then transferring the resultant data back to the software domain.

Examples of hardware accelerators include the IBM Cell B.E. (broadband engine) processor, encryption units, compression/decompression engines and graphics processing units (GPUs). Hardware accelerators may be programmable to enable specialization of a particular task or function and may include a combination of software, hardware, and firmware. Hardware accelerators may be attached directly to the processor complex or nest, by PCIexpress (peripheral component interconnect) IO (input-output) slots or remotely via high-speed networks.

Hardware accelerators may be implemented in separate integrated circuits including FPGAs (Field Programmable Gate Arrays) and connected via a bus to a general purpose microprocessor, Multiple co-processors serving as hardware accelerators may be instantiated on the same die as the processor or as part of a multi-chip module (MCM), as in the case of IBM's Power series mainframe systems.

Typical uses of hardware accelerators may include compression and decompression of memory pages to conserve overall memory usage. If a block of data residing in memory has not been recently used and main memory space is limited, compressing the block can reduce the address space necessary for storage and when the same data is needed for subsequent processing it can be recalled and decompressed. Having a dedicated hardware accelerator to perform this function relieves the general purpose processor from this task, performs the compression and decompression operations at higher throughput, allowing the general purpose processor to continue executing other processing functions, and maximizes efficient utilization of finite memory resources.

Similarly, when encrypted data is received from an I/O device for processing, encryption/decryption engines enable analysis of the received data to proceed more efficiently, which can speed timely analysis of, for example, financial or telemetry data. In this regard, accelerators may aid processing merely by transposing data formats compatible with a certain application or protocol. Off loading this function from the main processor eliminates processing bottlenecks associated with such tasks.

Management of a diverse pool of processing resources may be accomplished through high level controllers known as hypervisors or virtual machine managers (VMM). These implement hardware virtualization techniques allowing multiple operating systems to run concurrently on a host computer. The hypervisor provides a virtual operating platform and manages the execution of the guest operating systems and applications. Multiple instances of a variety of operating systems may share the virtualized hardware resources. Hypervisors are installed on server hardware whose only task is to run guest operating systems. Non-hypervisor virtualization systems are used for similar tasks on dedicated server hardware, but also commonly on desktop, portable and even handheld computers.

Logical partitioning (LPAR) allows hardware resources to be shared by means of virtualization among multiple guest operating systems. One guest operating system comprises one LPAR. Two LPARs may access memory from a common memory chip, provided that the ranges of addresses directly accessible to each do not overlap. One partition may indirectly control memory controlled by a second partition, but only by commanding a process in that partition. CPUs may be dedicated to a single LPAR or shared. On IBM mainframes, LPARs are managed by the hypervisor. IBM mainframes operate exclusively in LPAR mode, even when there is only one partition on a machine. Multiple LPARs can run on one machine or be spread across multiple machines.

Efficient utilization of a finite number of hardware accelerators requires a queue management system to prioritize processing jobs and ensure fairness in allocating available processing acceleration resources amongst the LPARs. Computer systems must accommodate scheduling, dispatch, execution and perhaps termination of a wide variety of processing jobs with different execution latencies and vastly different memory constraints. High priority applications, even those with predictable processing requirements, may demand a disproportionately large share of processing resources, thereby inhibiting completion of lower priority jobs—perhaps indefinitely—because a higher priority job may always take precedence over a lower priority job. To prevent a high bandwidth job from completely dominating acceleration resources, a fairness protocol is needed to ensure lower priority jobs are executed within an acceptable period of latency.

Even in computer systems employing hardware acceleration, co-processing resources are limited and must be carefully managed to meet expected throughput requirements of all applications running on the system. In this regard, processing latency would be enhanced by a queue management scheme capable of dynamically configuring available hardware acceleration queues so processing jobs may be assigned to queues based on usage, job latency and capacity.

SUMMARY

The embodiments of the invention relate generally to queue management in computing systems having a variety of co-processor resources and more particularly to an apparatus and method for implementing multiple hardware queues for dispatching jobs to a plurality of hardware acceleration engines. For each type of hardware acceleration engine there is assigned a dedicated queue, and each queue includes a dedicated head of queue entry. A pool of floating queue entries may be dynamically allocated across multiple queues. In this regard, queue depth limits are configurable and may be modified to accommodate processing needs. The system also has the capability to remove one or more jobs across all queues to accommodate changes in the availability of resources and maintenance.

The hardware acceleration engines process jobs within a bounded latency. Latencies may vary, sometimes by orders of magnitude from one acceleration engine type to another. Therefore queue waiting time may vary considerably as between different queue types. The capability for limiting the number of queue entries allocated to a queue coupled with the dynamically shared queue entries provides advantages over prior art in that a burst of job requests for a longer latency engine does not consume all the floating entries, thereby making them unavailable for lower-latency jobs allocated for other queues. Further, the parallel structure of the entries and queues rather than the sequential access nature of the memory buffer in, for example, U.S. Pat. No. 7,113,516, enables parallel operation of the queues, leading to lower latency of the entire queuing mechanism. The parallel structure of the entries and queues also allows a parallel search for jobs to remove from the queues, rather than limiting to a sequential search.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION

Figure 7:
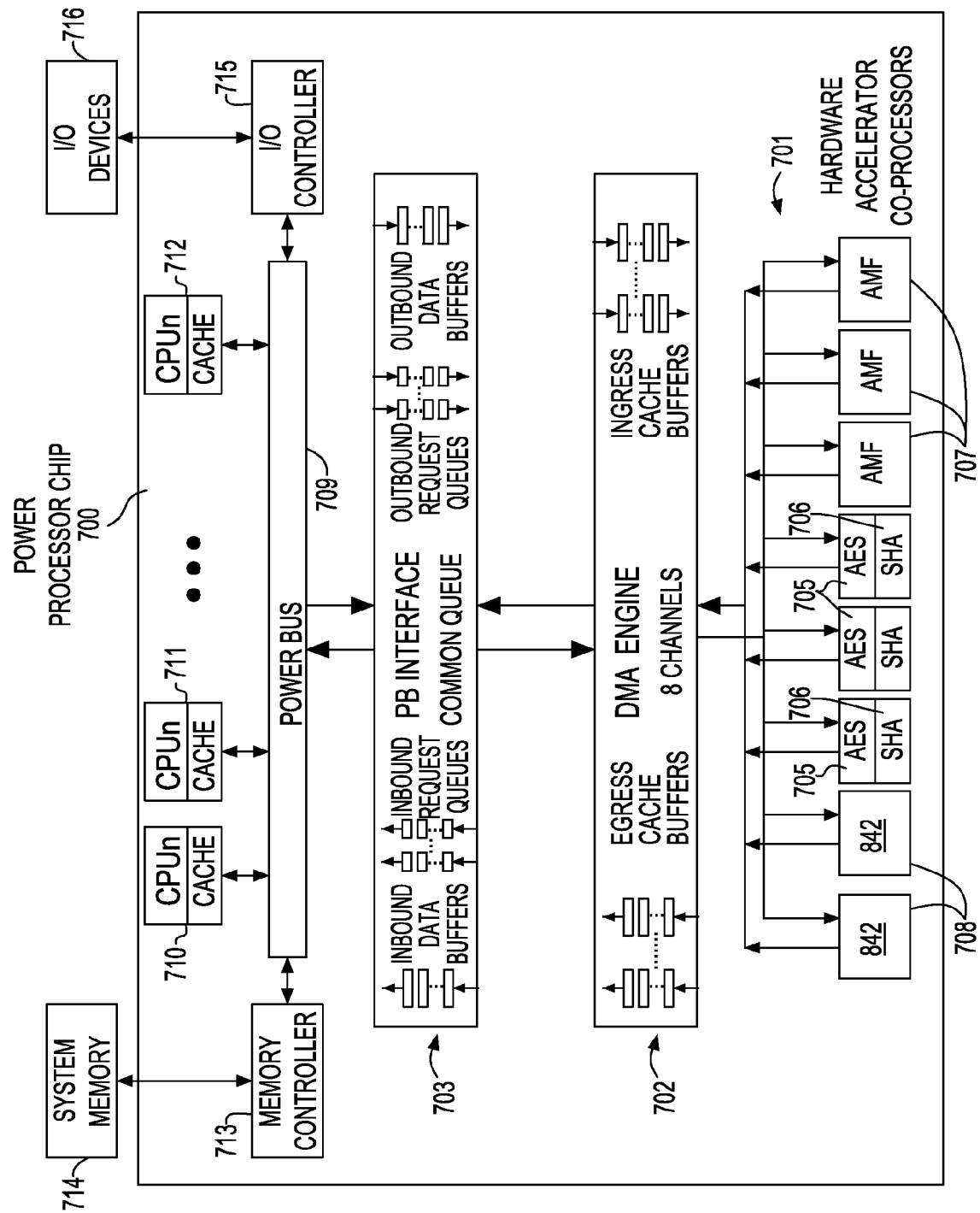
FIG. 7 shows a block diagram of data flow in a computer system utlizing co-processors for hardware acceleration.

An example of a computer architecture employing dedicated co-processor resources for hardware accleration is the IBM Power Server system. A simplified block diagram of hardware acceleration dataflow in the Power Server System is shown in FIG. 7. Power Processor chip 700 has multiple CPU cores (0-n) and associated cache 710, 711, 712 which connect to Power Bus 709. Memory controller 713 provides the link between Power Bus 709 and external system memory 714. I/O controller 715 provides the interface between Power Bus 709 and external I/O devices 716. Power Bus 709 is the bus fabric that facilitiates data, address, and control movement between the various interconnected components.

Co-processor Engines 701 perform cryptographic functions and memory compression/ decompression. DMA engine 702 reads and writes data and status on behalf of co-processors. PowerBus Interface (PBI) 703 buffers data routed between the DMA engine 702 and PowerBus 709 and enables bus transactions necessary to support co-processor data movement, interrupts, and memory management I/O associated with hardware accleration processing.

Advanced encryption standard (AES) and secure hash algorithm (SHA) cryptograph accelerators 705, 706 are connected pairwise to a DMA channel, allowing a combination AES-SHA operation to be processed moving the data only one time. Asymmetric Math Functions (AMF) 707 Perform RSA cryptography and ECC (eliptical curve cryptography). 842 accelerator co-processors 708 perform memory compression/decompression.

In order for the accelerators to perform work for the system, accelerator unit 701 must be given work from the hypervisor. A request for co-processor hardware acceleration is initiated when a co-processor request command is received by the PBI 703. Permission to issue the request, the type of co-processor operation, and availability of a queue entry for the requested type of co-processor operation are checked and assuming all checks are passed, the command is enqueued and a state machine is assigned to the request, otherwise the co-processor job request is rejected. If a request is successfully enqueued, when a co-processor is available the job will be dispatched to the DMA engine, i.e., PBI 703 signals DMA engine 702 that there is work for it to perform and DMA engine 702 will remove the job from the head of the job request queue and start processing this request. DMA engine 702 then assigns the co-processor request to an appropriate DMA channel connected to the type of co-processor requested. DMA 702 tells the co-processor to start and also begins fetching the data associated with the job request. If a requested input queue is full, the Power Bus Interface will issue a PowerBus retry partial response to the co-processor request. When the data arrives, PBI 703 will direct data to the correct input data queue and inform DMA 702 the queue is non-empty. When the co-processor has output data or status to be written back to memory, it makes an output request to DMA 702, and DMA 702 moves the data from the co-processor to local buffer storage and from there to PBI 703 and PBI 703 writes it to memory. A co-processor also signals to DMA 702 when it has completed a job request accompanied by a completion code indicating completion with or without error. Upon completion, the co-processor is ready to accept another job request.

Figure 1:
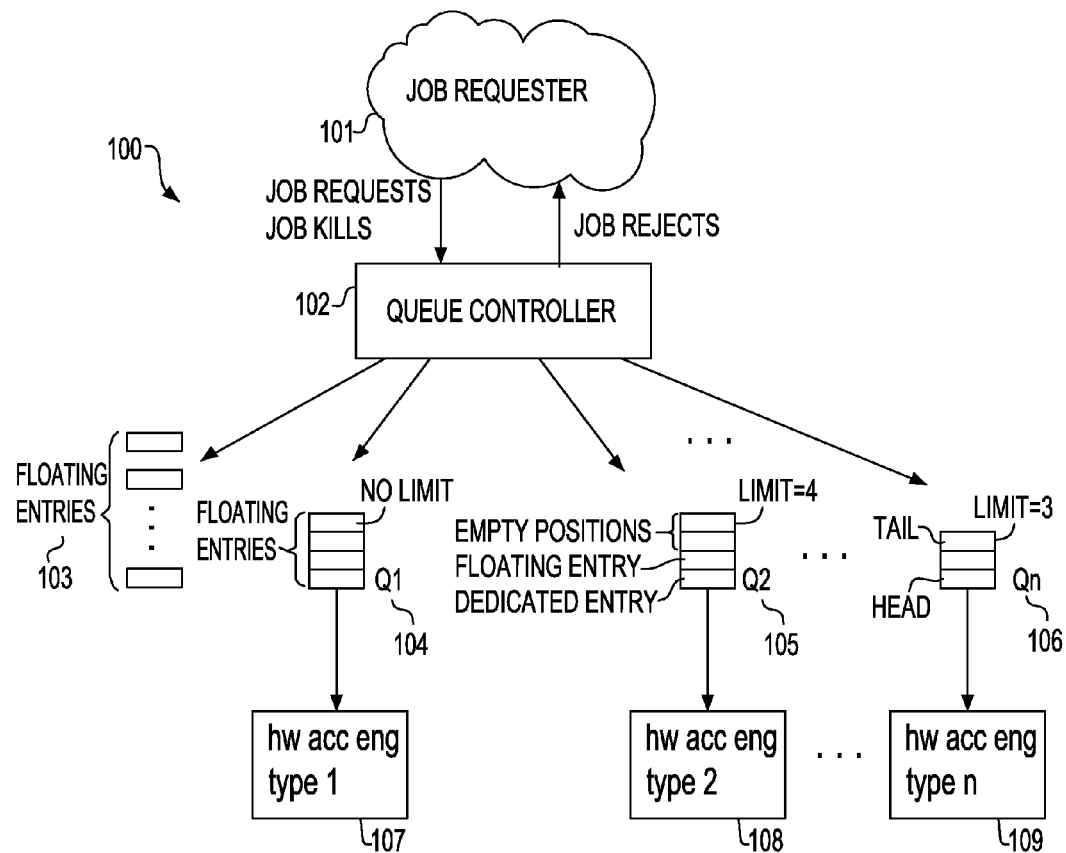
FIG. 1 illustrates a block diagram of an exemplary computer system architecture having a multiple queue system according to embodiments of the invention.

With reference to a first embodiment, FIG. 1 shows a Queue Controller 102 and a plurality of queues 104, 105 and 106 for enqueuing jobs received from Job Requestor 101 and dispatching the jobs from the heads of the queues to hardware acceleration engines 107, 108 and 109, which may include different methods of encryption (RSA, AES), compression/decompression, or data analytics. A person of skill in the art will appreciate that many types of hardware accelerator engines could be employed using embodiments of the present invention and are not limited to the type shown in FIG. 7. FIG. 1 shows one queue (Q1, Q2 . . . Qn) for each type of hardware acceleration engine 107, 108 and 109.

A queue comprises one or more queue positions ("position") in memory arranged in first-in-first-out stack order, wherein the depth of the stack is variable. Queue positions are shown in FIG. 1 as rectangular boxes representing empty positions, floating entries or dedicated positions. A position corresponds to the place in the order of the total number of queue entries allocated to a particular acceleration engine and is either empty or full. A full position has a queue entry ("entry") with a job allocated to it; an empty position does not.

A queue entry is made up of storage elements containing information pertaining to a job, such as identifiers connecting the job to a software process, entry empty or full bit, queue position, operands, or memory addresses specifying the location of instruction groups to be processed. Queue entries may also specify job priority and whether a job is completed through an interrupt or a write access to memory. As shown in Qn 106 of FIG. 1, the position at which an entry is first enqueued in a queue is the tail; the position from which a entry may be dequeued (position made empty) and job dispatched to an engine is the head. For simplicity, these position descriptors are not shown in queues Q1 and Q2. Entries advance by one queue position as jobs are dequeued and dispatched from the head position. In this manner an entry is emptied and becomes available to receive a new job from the Queue Controller. In a queue with a single position or in an empty queue, the tail position is the same as the head position.

As shown in FIG. 1, there are two types of entries: dedicated and floating. A dedicated entry, be it empty or full, is permanently assigned to a queue. If a dedicated entry is empty it is available to accept a job for the assigned queue from Queue Controller 102. A floating entry 103 may be allocated to the tail of the queue and filled with a job if the number of entries allocated to the queue has not exceeded a configurable limit if such a limit exists.

Figure 3:
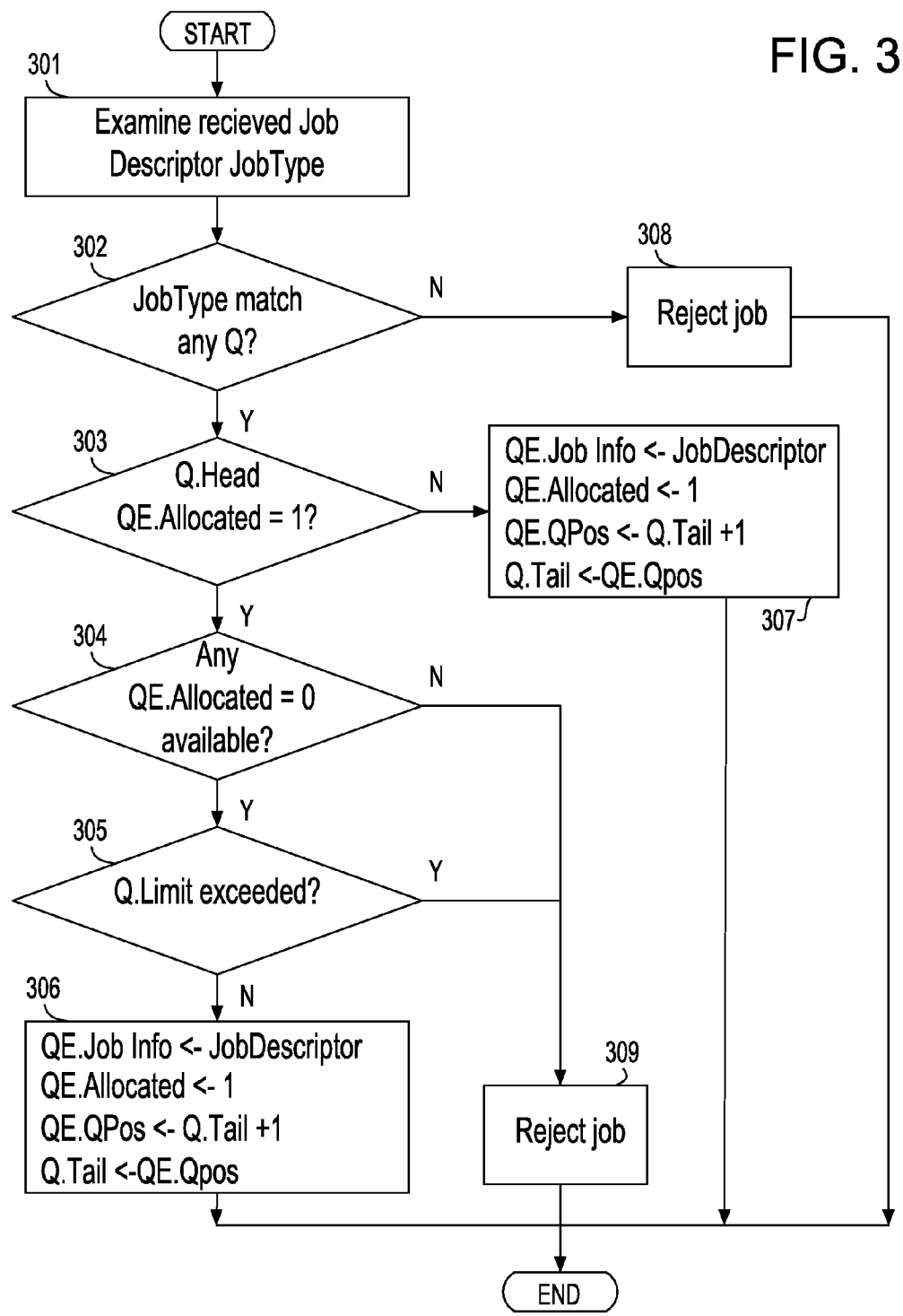
FIG. 3 shows a flow diagram illustrating the contents of control registers in connection with enqueing a job in one of the multiple queues.

Referring to FIG. 3, a queue entry may be specified in a hardware description language, such as VHDL or Verilog.

Job Requestor 101 may at any time request that one or more jobs associated with a particular identifier be removed from any and all of the queues, in any and all queue positions. This operation is called a "kill" Queue entries associated with killed jobs are emptied and become available to receive another job. Queue Controller 102 includes logic to interrogate this identifier in all allocated entries and remove entries with matching identifiers from the queues.

Queue Controller 102 decides whether to accept a job from the Job Requestor for a given queue. To do so, it examines the job type, i.e., which type of hardware acceleration engine it requires, to choose the correct queue from the plurality of queues. If the entry dedicated to the head position of the destination queue is empty, the job is accepted and the entry at the head is filled with the job. If the entry at the head is full, the Queue Controller checks if the number of entries allocated to the queue is less than the limit and that a floating entry is available. If both of these conditions are true, the job is accepted, a floating entry is filled with the job and allocated to the tail of the queue. Otherwise, the job is rejected.

Figure 2:
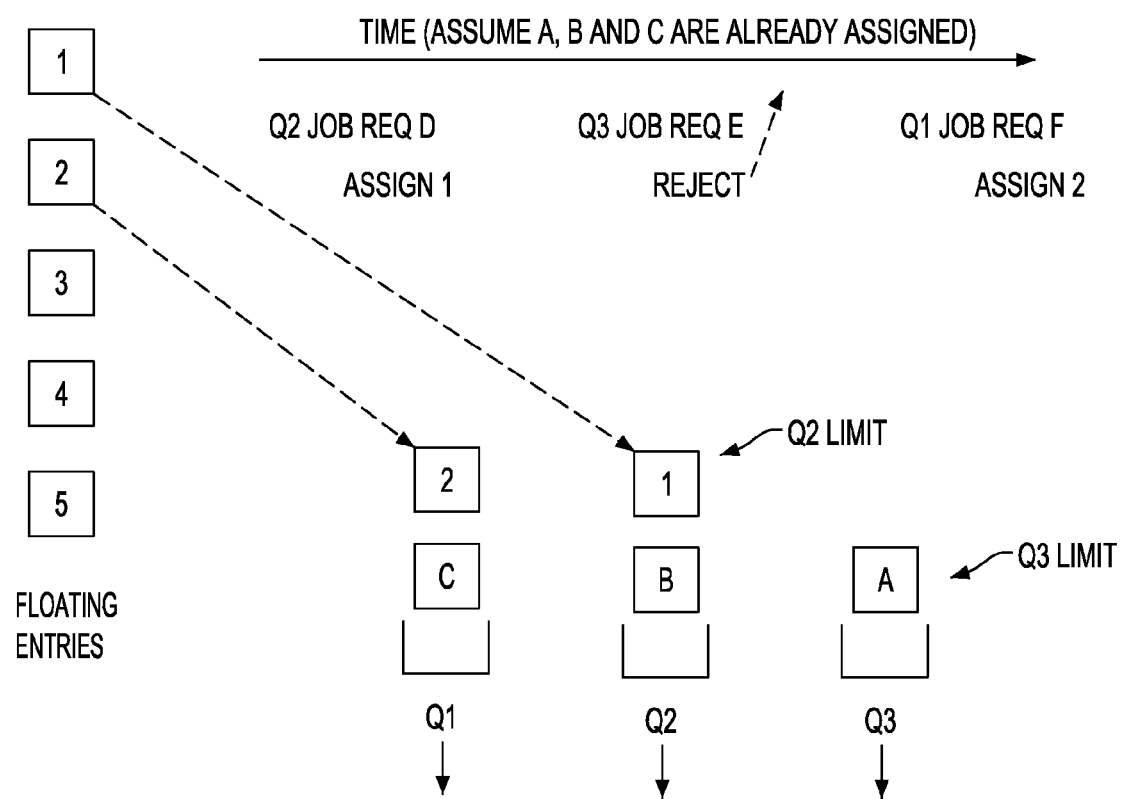
FIG. 2 depicts a diagram illustrating the operation of a queue controller managing multiple queues having a combination of dedicated and floating queue entries.

FIG. 2 shows an example of an embodiment in operation. There are three job queues Q1, Q2, Q3 and eight entries. There are 3 dedicated entries, one for each of the three queues shown, which are represented by the open ended boxes above Q1, Q2 and Q3. The remaining five entries are shown as floating entries 1-5.

A floating entry may be allocated to Q3 if the number of entries allocated to Q3 is less than the Q3 Limit and an empty floating entry is available, or to Q2 if the the number of entries allocated to Q2 is less than the Q2 Limit and an empty floating entry is available. The remaining emtpy floating entries may be allocated to Q1. For example, if the Q3 Limit is set to 1 and the Q2 Limit is set to 2, then only one dedicated entry may be allocated to Q3; and one dedicated entry plus one floating entry may be allocated to Q2. The remaining three floating entries may only be allocated to Q1.

In the example shown in FIG. 2, earlier in time jobs A, B, and C filled the dedicated entries of each queue and were allocated to the head positions of queues Q1, Q2, and Q3, respectively. As time advances, job request D for Q2 is received. An empty floating entry is available and the number of entries enqueued in Q2 is less than the limit, therefore floating entry 1 is allocated to Q2 and filled with job D. Next, job request E for Q3 is received. An empty floating entry is available but the number of entries enqueued in Q3 equals the limit, therefore job request E is rejected. Next, job request F for Q1 is received. An empty floating entry is available and Q1 has no limit, therefore floating entry 2 is allocated to Q1 and filled with job E.

Figure 4:
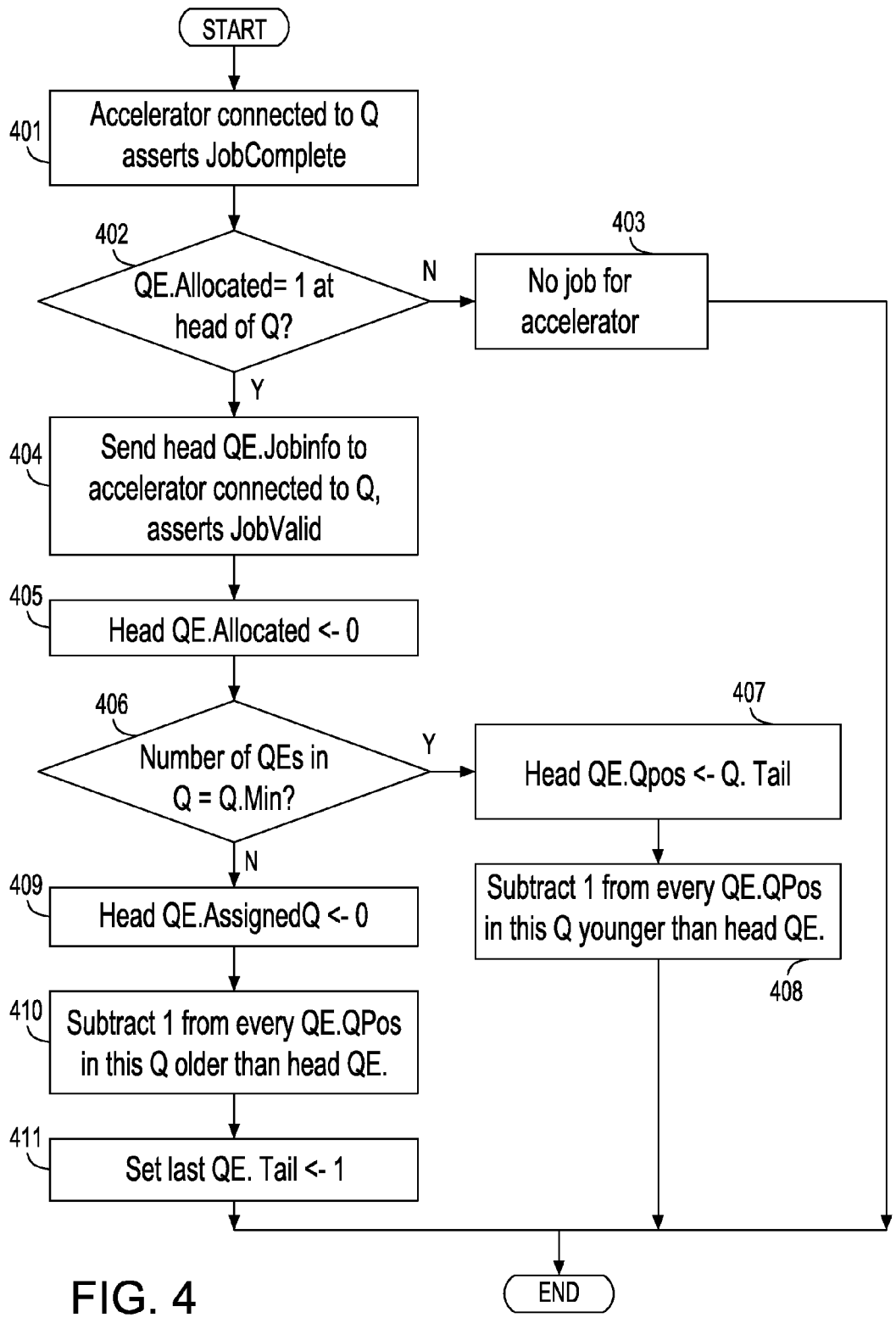
FIG. 4 shows a flow diagram illustrating the contents of control registers in connection with dispatching a job from a queue to a hardware accelerator attached to the queue.
Figure 5:
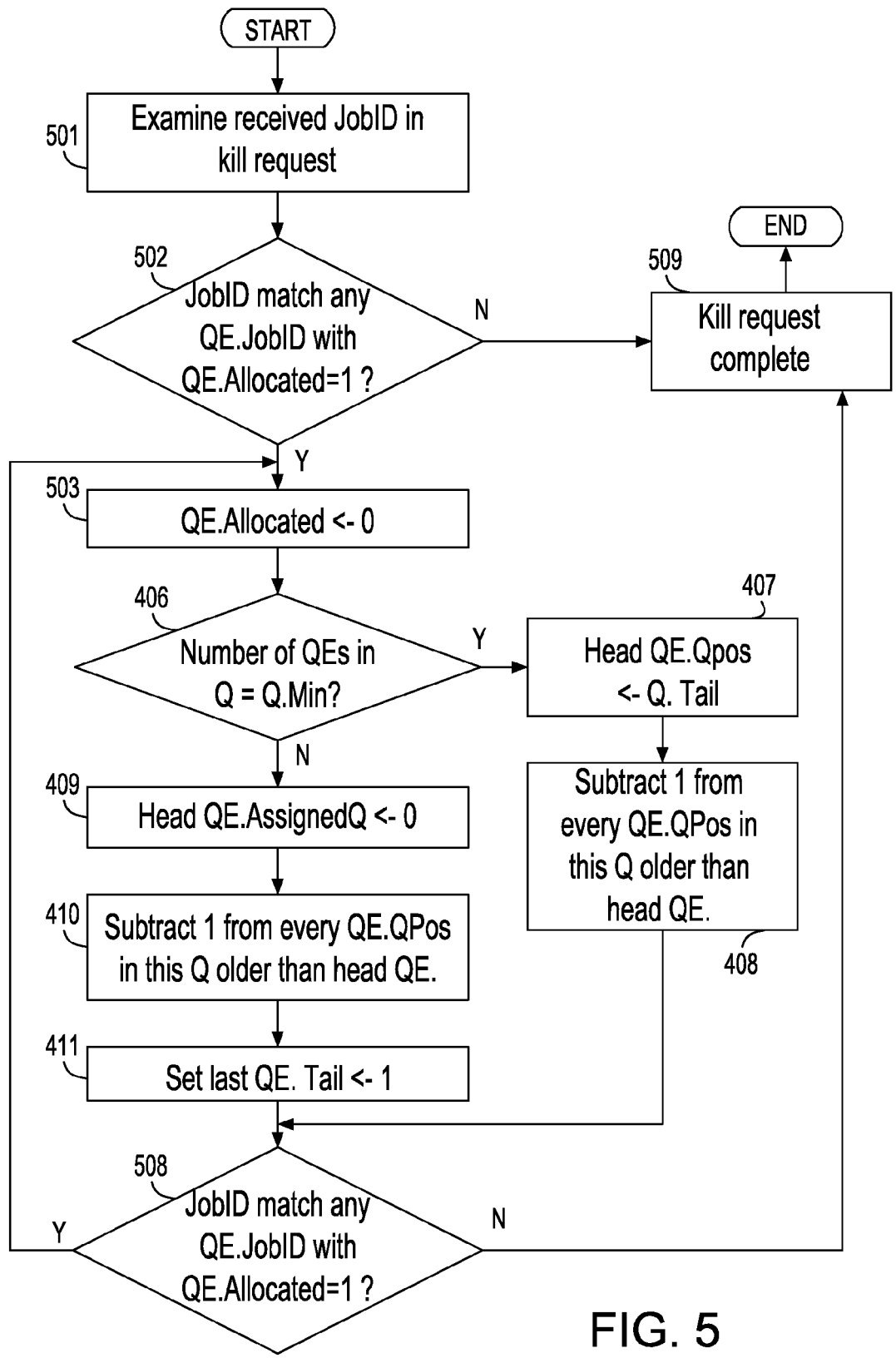
FIG. 5 shows a flow diagram illustrating the contents of control registers in connection with terminating jobs identified by a Job Requestor.

FIGS. 3-5 describe the operation of the Queue Controller (QC) with respect to the following events: 1. asssignment of a Queue Entry (QE) to particular Queue, i.e., enqueing a job; 2. Job Completion and Job Dispatch; and 3. Job Termination ("JobKill"). The QC receives jobs from a Job Requestor and controls a plurality of Queue Entries (QE) by dynamically assigning Queue Entries to one of several queues. The QC dispatches jobs from the queues to hardware accelerators attached to the queues and is able to terminate jobs identified by the Job Requestor. A particular queue is referred to as Qn. A QE may be implemented with a series of registers in hardware named and defined as follows:

TABLE 1

| REGISTER NAME | DEFINITION |
| --- | --- |
| Allocated | if = 1 then this QE has a valid JobInfo else JobInfo is invalid. |
| AssignedQ | if = 0 then this QE is not assigned to any Q else it is assigned to the Q number in this field. |
| QPos | if = 0 then this QE is in the head position of Q else it is in the indicated position, $1^{st}$, $2^{nd}$, etc. |
| JobInfo | Multiple variable length fields that define the job, e.g., operation code, operand addresses, unique job identifier, etc. |

A queue has several necessary parameters and variables that may be stored in registers associated with the queue. Referring to FIG. 3, Q.Head defines QE.QPos=0 in a Q. Thus, QPos=0 refers to the first position in a queue. Q.Tail refers to the youngest position, i.e., highest numbered QE.QPos, in a Q or QE that will be dispatched to a hardware accleraor last. Q.Min refers to the minumum number of QEs assigned to a Q, which represent the fixed QEs assigned to a queue. Q.Limit is the maximum number of QEs that may be assigned to a queue.

The JobRequester supplies the QC a JobDescriptor that contains at least a JobType, which identifies the Q to which a job will be assigned, and JobID, which uniquely identifies the job.

With reference to FIG. 3, in step 301 QC examines the JobType in the JobDescriptor received from the Job Requestor. In step 302, if the JobType does not match any of the Qs, no accelerator exists for the requested job type and the job is rejected in step 308, i.e., an indication is sent back to the Job Requestor that the QC could not accept the job. It may be observed by a person of skill in the art that additional information may be provided further qualifying the type of rejection.

If the JobType matches a dedicated hardware accelerator for a specific Q, step 302 continues to step 303 which ascertains whether Q.Head is already allocated. If it is not, then the incoming job may be enqueued in this QE in step 307 and in this instance Q.Head=Q.Tail. If it is already allocated, then step 304 determines whether any unallocated, i.e., floating, QEs exist. If no floating entries are available, the job is rejected in step 309. If at least one unallocated QE exists, step 305 determines whether Q.Limit has been met; if it has then the job is rejected in step 309. If Q.Limit has not been met, then step 306 enqueues QE at the tail of Q. In boxes 306 and 307, the notation QE.JobInfo<-JobDescriptor means fields from the JobDescriptor the hardware accelerator requires to perform the job are copied from the JobDescriptor to the QE.JobInfo register. Such fields may comprise operation code, operand addresses, unique job identifier, job priority, etc.

FIG. 4 describes the QC action of dispatching a job from a queue to an attached accelerator. It will be appreciated by one skilled in the art that an interface (not shown) between QC and the attached accelerator is implemented where:

The accelerator can signal to QC that it may accept another job by asserting the JobComplete signal.

The QC may dispatch JobInfo from Q.Head to the accelerator simultaneously asserting a JobValid signal to the accelerator.

In step 401, the accelerator has asserted JobComplete, indicating to the

QC that it can accept another job. Step 402 follows where the QC determines if there is a job at Q.Head. If no job is enqueued, the process moves to step 403 and ends. The QC periodically checks the job status for a job at Q.Head; if there is a job, in step 404 the QC sends Q.Head QE.JobInfo to the accelerator and asserts JobValid and in step 405 Q.Head QE is marked as not allocated.

Step 406 queries whether the number of queue entries in the queue is equal to Q.Min. If yes, Q.Head becomes Q.Tail in step 408, then QEs younger than Q.Head, if any, are moved forward one queue position in Q in step 408. Otherwise in step 409, the QE at Q.Head is deallocated and the QEs in Q are advanced one queue position toward Q.head in step 410 and the Q.Tail is updated with the QPos of the new tail QE.

FIG. 5 describes the action of terminating a queue entry (QE kill), i.e., dequeuing, a QE from the queues. For ease of exposition, it is assumed that QC activities of enqueuing and dispatching jobs are suspended until the kill is completed. This assumption is not limiting as one skilled in the art could design a system where these activities proceed concurrently. In step 501 a kill request of job JobID is received by the QC from the Job Requestor and in step 502 all allocated QEs are examined to see if there is a match. If there is no match, step 509 follows and the kill is completed trivially with no jobs killed. If there is a match, the QE containing the job is deallocated in step 503, step 406 ensues with either steps 407 and 408, or 409, 410, and 411, which move QEs toward head in Q as described previously.

In another embodiment of the invention, the JobDescriptor contains priority information, for example, a single bit field indicating the job is high priority if the field is 1 and low priority if the field is 0, or multiple bit fields could be used to create a broader range of priorities. The Queue Entry contains register storage for the job priority information that is filled from the JobDescriptor when the job is enqueued. The Job Dispatch function of the Queue Controller uses the job priority information in the enqueued queue entries to determine the highest priority job to dispatch next. In the previous example, if a job of low priority were enqueued at the head of the queue and a job of high priority were enqueued behind it, Job Dispatch would dispatch the high priority job at the next opportunity rather than the low priority job at the head of the queue. In this embodiment, the Queue Controller further employs a fairness algorithm to ensure that high priority jobs do not forever prevent lower priority jobs from being dispatched. Such algorithms are known by those skilled in the art and not further elaborated here. One skilled in the art would also appreciate that the same prioritized dispatch could be accomplished alternatively by partitioning a queue into a plurality of queues, one for each level of priority, enqueuing a job of given priority into the corresponding queue, and dispatching from highest priority queue first, then next highest priority queue, and so on, down to the lowest priority queue, applying a fairness algorithm as previously mentioned.

Figure 6:
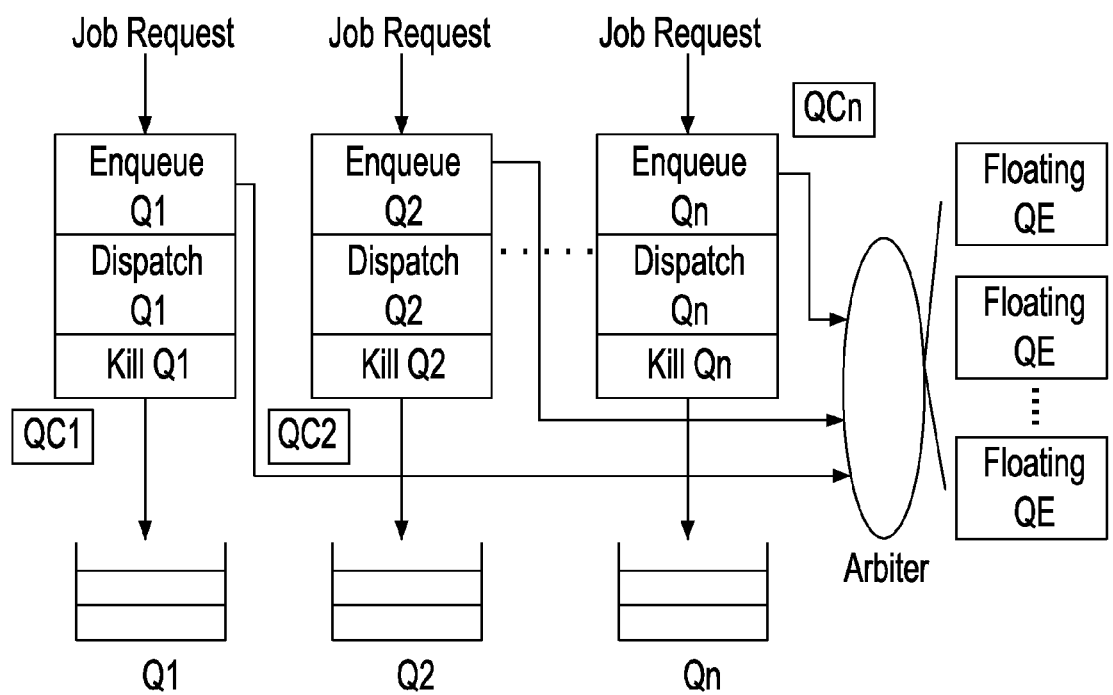
FIG. 6 illustrates a block diagram of a segmented queue controller capable of handling operations, including creating queue entries, dispatching jobs and terminating jobs in parallel according to embodients of the invention.

In another embodiment of the invention, multiple job requests are received by Queue Controller 102 in parallel. The Queue Controller is partitioned into segments, one segment per queue type. The segments enqueue entries, dispatch jobs to engines, and handle kill requests in parallel. The segments must arbitrate with each other for access to the shared floating entries. With reference to FIG. 6, N QC segments are shown (QC1, QC2, . . . QCn) with three primary functions of Enqueue, Dispatch, and Kill shown abstractly as boxes and their respective queues Q1, Q2, . . . Qn under their control. Multiple job requests can come into the system concurrently at the top. A shared pool of floating QEs is shown on the right with access to the QEs controlled by an Arbiter. The Arbiter operates in steps 304, 305, and 306 in FIG. 3. In these steps, a QC segment with a job to enqueue must determine if a floating QE is available and if yes, step 306 enqueues the job. In a multi-QC system, a first QC would make a request to the Arbiter to gain access to the QEs; if a second QC currently had access to the QEs, the Arbiter would not grant the first QC access to the QEs until the second QC had moved on from step 306.

In another embodiment of the invention hardware acceleration engines are replaced with more generic queue servers. The queue servers have properties of type and service time (latency) not unlike the hardware acceleration engines.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method of managing processing resources in a computer system in which a plurality of co-processors are used to accelerate processing of certain functions, comprising:

enqueuing a processing job in a queue management system, wherein enqueuing a processing job in a queue management system, comprises:
  providing a plurality of registers to create a job controller function to reflect states of predefined variables;
  determining whether a job type for an incoming first job request matches a function assigned to one of a plurality of job queues and rejecting the job if the job type does not match;
  determining whether a first position in the matching job queue is available if the job type matches the function of one of the plurality of queues;
  allocating the first job to the first position of the matching job queue if available or to a second position of the matching job queue if the first position is not available and a floating queue entry is available and the limit is not exceeded;
  loading a first register of the plurality of registers with a description of the first job;
  asserting an allocation flag for the first job in a second register;
  loading a queue position for the first job in a third register;
  asserting a last position flag in a fourth register for the first job if the first position is occupied by another job; and
  rejecting the job request if none of the plurality of queue entries for the matching job queue are available to accept a job;
scheduling the processing job to execute on one of the plurality of co-processors;
dispatching the processing job from a queue to the one of the plurality of co-processors; and
terminating a processing job in a queue management system in response to a termination request from the queue management system.

2. The method according to claim 1, wherein dispatching processing jobs from a queue to one of the plurality of co-processors further comprises:
  asserting a job completion flag for a first hardware acceleration engine;
  determining whether a next job is enqueued in a first position of a queue coupled to the first hardware acceleration engine;
  sending job information to the first hardware acceleration engine for the next job;
  asserting a job valid flag for the first hardware accleration engine;
  deasserting an allocation flag for the first position of the first queue coupled to the first acceleration engine;
  determining whether the number of queue entries held in the first queue is at a predefined minimum, wherein
    the contents of a last position queue entry register are loaded into a first position queue entry register if the minium number of queue entries is detected, then subtracting one from every queue entry position in the first queue older than the queue entry of the first position queue entry register, else
  loading the contents of a first position queue entry register with a null value if the minimum number of queue entries is not detected;
  moving every queue entry forward one position in the first queue; and
  asserting a last position queue entry register to one in the last queue entry.

3. The method according to claim 1, wherein terminating a processing job in a queue management system further comprises:
  determining whether a job identifier specified in a job termination request matches an identifier for any allocated queue entry, wherein the termination request ends if there is no match;
  deasserting an allocation flag in a first register for a queue entry corresponding to the terminated job;
  determining whether there are a minimum number of queue entries held in a first queue in which the terminated queue entry was assigned, wherein
    the contents of a last position queue entry register are loaded into a first position queue entry register if the minium number of queue entries is detected, then subtracting one from every queue entry position in the first queue older than the queue entry of the first position queue entry register, else
  loading the contents of a first position queue entry register with a null value if the minimum number of queue entries is not detected;
  subtracting one from every queue entry position in the first queue loaded before the queue entry residing in the first position queue entry register; and
  asserting a last position queue entry register to one in the last queue entry.

* * * * *